United States Patent
Ooishi

(10) Patent No.: US 6,643,581 B2
(45) Date of Patent: Nov. 4, 2003

(54) NAVIGATION SYSTEM FOR TRANSMITTING REAL-TIME INFORMATION ALLOWING INSTANT JUDGEMENT OF NEXT ACTION

(75) Inventor: Tsukasa Ooishi, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/949,613

(22) Filed: Sep. 12, 2001

(65) Prior Publication Data

US 2002/0128770 A1 Sep. 12, 2002

(30) Foreign Application Priority Data

Mar. 9, 2001 (JP) ........................................ 2001-067452

(51) Int. Cl.⁷ .............................................. G01C 21/26
(52) U.S. Cl. ....................................... 701/207; 701/209
(58) Field of Search ................................ 701/200, 207, 701/208, 209; 340/988, 990, 995

(56) References Cited

U.S. PATENT DOCUMENTS

| | | | | |
|---|---|---|---|---|
| 6,138,072 A | * | 10/2000 | Nagai | 340/988 |
| 6,169,515 B1 | * | 1/2001 | Mannings et al. | 342/357.1 |
| 6,199,045 B1 | * | 3/2001 | Giniger et al. | 705/1 |
| 6,266,612 B1 | * | 7/2001 | Dussell et al. | 701/207 |
| 6,285,317 B1 | * | 9/2001 | Ong | 340/995 |
| 6,292,743 B1 | * | 9/2001 | Pu et al. | 455/456 |
| 6,374,177 B1 | * | 4/2002 | Lee et al. | 340/988 |
| 6,400,690 B1 | * | 6/2002 | Liu et al. | 340/995 |
| 6,438,488 B2 | * | 8/2002 | Lee | 340/988 |
| 6,484,091 B2 | * | 11/2002 | Shibata et al. | 701/208 |
| 2001/0027375 A1 | * | 10/2001 | Machida et al. | 701/209 |
| 2002/0013656 A1 | * | 1/2002 | Namba | 701/200 |
| 2002/0103781 A1 | * | 8/2002 | Mori et al. | 707/1 |
| 2002/0165666 A1 | * | 11/2002 | Fuchs et al. | 701/209 |

FOREIGN PATENT DOCUMENTS

| | | |
|---|---|---|
| JP | 10-224291 | 8/1998 |
| JP | 2000-298029 | 10/2000 |

* cited by examiner

Primary Examiner—Richard M. Camby
(74) Attorney, Agent, or Firm—McDermott, Will & Emery

(57) ABSTRACT

A server receives real-time information indicating a ground road traffic state and the like from a satellite or a camera at certain time intervals, and updates and records the real-time information in a database. If receiving positional information such as a present position from a navigator of a client, the server determines an information extraction range based on the positional information, extracts real-time information falling within the determined information extraction range from the database and transmits the extracted real-time information to the navigator through a satellite communication network. A main body unit of the navigator receives the real-time information and the navigator displays the received real-time information on a display unit. As a result, the present invention can transmit real-time information allowing a client to instantly judge a next action while moving by vehicle.

14 Claims, 12 Drawing Sheets

SHOP INFORMATION
(VACANCY, MENU, ETC.)

CLICK

CLICK

SET RESERVATION

SET RESERVATION

NAVIGATION SYSTEM FOR TRANSMITTING REAL-TIME INFORMATION ALLOWING INSTANT JUDGEMENT OF NEXT ACTION

BACKGROUND OF THE INVENTION

1. Field of the Invention

The present invention relates to a navigation system and particularly relates to a navigation system capable of instantly transmitting real-time information to a navigator mounted on a client's vehicle.

2. Description of the Background Art

A conventional navigation system is constituted to measure the position and azimuth of a client's vehicle by GPS (Global Positioning System), a speed sensor, an azimuth sensor and the like, and to display the measured positional information at need while superposing the information on map information read from a CR-ROM or an IC memory.

Further, Japanese Patent Laying-Open No. 10-224291 (1998) describes a mobile object communication equipment wherein if a client transmits a request to describe a present position on map information from the on-vehicle equipment of a client's vehicle to the closest server among a plurality of servers through a telephone network, the server transmits data such as road traffic information around the client, nearby parking lots, vacancy information on the parking lots, shop information, advertisement and tourist guides as well as map information describing the present position of the client, to the on-vehicle equipment of the client.

However, the conventional navigation system only displays map information describing a present position and not display the traffic state of the road on which the client's vehicle is traveling. Due to this, the client cannot instantly make the next judgment. That is, the conventional navigation system has a disadvantage in that the client cannot instantly judge whether to travel on a road on which the client is currently traveling or to change the road to another road.

Meanwhile, according to the mobile object communication equipment disclosed by Japanese Patent Laying-Open No. 10-224291(1998), traffic information on roads around the client is transmitted to the client. However, since the road traffic information is information on areas near the client, the client cannot accurately judge whether or not to change the present road.

SUMMARY OF THE INVENTION

It is, therefore, an object of the present invention to provide a navigation system for transmitting real-time information allowing a client to instantly judge the next action while moving by a vehicle.

A navigation system according to the present invention includes: a database holding real-time information indicating a ground state; a server receiving positional information including a present position of a client through a satellite communication network, determining, as an information extraction range, a certain range on a map wider than a surrounding area of the present position based on the positional information, extracting, as real-time information to be transmitted, real-time information falling within the information extraction range and having a transmittable largest data quantity from the database, adding a header identifiable by the client to the extracted real-time information and transmitting the header-added real-time information through the satellite communication network at random; and a navigator transmitting the positional information to the server through the satellite communication network, receiving information from the server through the satellite communication network, detecting the extracted real-time information from the received information while using the header, and displaying the detected real-time information.

In the navigation system according to the present invention, if the navigator transmits positional information such as the client's present position to the server, the server transmits real-time information on areas in the traveling direction of the client to the client's navigator. Then, the navigator displays the received real-time information. According to the present invention, therefore, the client can instantly make various judgments based on the received real-time information.

Preferably, the server of the navigation system determines a certain range on an orthogonal coordinate with the present position set as an origin, as the information extraction range.

If receiving the client's present position from the navigator, the server transmits real-time information which falls within a certain range with the present position set as an origin, to the navigator. According to the present invention, therefore, information on not only the road on which the client is traveling but also on traffic states of other roads and shops can be transmitted to the client.

Preferably, the server of the navigation system updates the real-time information held by the database at certain time intervals or every time the positional information from the client is received.

The real-time information held in the database is updated at random. According to the present invention, therefore, it is possible to transmit update real-time information to the client.

Preferably, the navigator of the navigation system extracts real-time information falling within a designated range inputted by the client from the received real-time information based on the designated range inputted by the client, and displays the extracted real-time information.

In the navigator, the received real-time information is further limited and extracted based on the designation range inputted by the client. According to the present invention, therefore, the client can select only the necessary real-time information from the real-time information received from the server and use the selected real-time information.

Preferably, the real-time information is a traffic state from the present position to a destination.

The navigator displays the traffic state from the present position to the destination received from the server on the display unit, and the client determines a road on which the client is to travel while looking at the displayed traffic state. According to the present invention, therefore, the client can arrive at the destination while avoiding the congestion of the roads.

Preferably, the navigator of the navigation system transmits moving time of the client from the present position to the server through the satellite communication network; and the server detects a range in which the client can move within the moving time based on traffic states of roads around the present position, and determines the detected range as the information extraction range.

A range in which the client can move within the certain time is determined as a range for extracting real-time information based on the congested state of the surroundings of the client's present position. According to the present invention, therefore, it is possible to know a place to which the client can move within the certain time.

Preferably, the real-time information includes a congested state of a restaurant; the navigator transmits a request inputted by the client to make a reservation at the restaurant to the server through the satellite communication network; and the server receives the reservation request through the satellite communication network, executes the requested reservation, and transmits an execution result to the navigator through the satellite communication network.

If the client transmits a request to make a reservation at a restaurant while looking at the congested state of the restaurant transmitted from the server, the server executes the restaurant reservation and transmits the result to the client. According to the present invention, therefore, the client can easily make a restaurant reservation even while moving by vehicle. As a result, wait time after the client arrives at the restaurant can be shortened.

Preferably, the real-time information includes a congested state of a shop, an article display state and a traffic state near the shop.

The client determines whether or not to do the shopping at a shop while looking at the congested state of the shop, the article display state of the shop and a traffic state near the shop displayed on the display screen of the client's navigator. If the client decides to do the shopping at the shop, the client selects an article which the client wants to buy from among the articles displayed on the screen. According to the present invention, therefore, it is possible to efficiently do the shopping without the need to select an article after arriving at the shop.

Further, a navigation system according to the present invention includes: a database holding real-time information indicating a ground state; a server receiving positional information including a present position of a client through a satellite communication network, determining, as an information extraction range, a certain region on a map wider than a surrounding area of the present position based on the positional information, extracting, as information to be transmitted, real-time information falling within the information extraction range from the database, adding a header identifiable by the client to the extracted real-time information, and transmitting the header-added real-time information through the satellite communication network at random; and a navigator transmitting the positional information to the server through the satellite communication network, receiving information from the server through the satellite communication network, detecting the extracted real-time information from the received information while using the header, and displaying the detected real-time information, wherein the server receives surrounding information on the client from a plurality of clients, and updates the real-time information in the database using the received surrounding information.

In the navigation system according to the present invention, the server updates the real-time information held in the database using the surrounding information on a plurality of clients. According to the present invention, therefore, it is possible to provide carefully thought out services to the respective clients.

Preferably, the surrounding information is information on an electrical system of a vehicle taken by the client.

The navigator mounted on the vehicle transmits information on the electrical system such as the turning on and off of the wiper of the vehicle or the turning on and off of the switch of an ABS to the server, and the server can detect the surrounding state of the client based on the information on the electrical system of the vehicle. According to the present invention, therefore, it is possible to obtain a lot of surrounding information from respective clients.

Preferably, the surrounding information is a history of the vehicle taken by the client. According to the present invention, therefore, it is possible to provide information so as to prevent a vehicle which has transmitted a history from having an accident.

Preferably, the surrounding information is a wiper speed of the vehicle taken by said client. According to the present invention, therefore, it is possible to provide weather information in the place where the client takes the vehicle.

Preferably, the server receives the surrounding information from the plurality of clients at certain time intervals.

The server updates the real-time information held in the database using the surrounding information on the client at predetermined time intervals. According to the present invention, therefore, the database can always hold update real-time information.

Preferably, the server extracts the real-time information falling within the information extraction range from the real-time information updated using the surrounding information, and transmits the extracted real-time information to the navigator through the satellite communication network.

The real-time information obtained from a plurality of clients is transmitted to the other clients in accordance with requests from the other clients. According to the present invention, therefore, it is possible to transmit real-time information useful to more clients.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The embodiments of the present invention will be described in detail hereinafter with reference to the drawings. It is noted that the same or corresponding constituent elements in the figures are denoted by the same reference symbols, which description will not be given repeatedly.

[First Embodiment]

Figure 1:
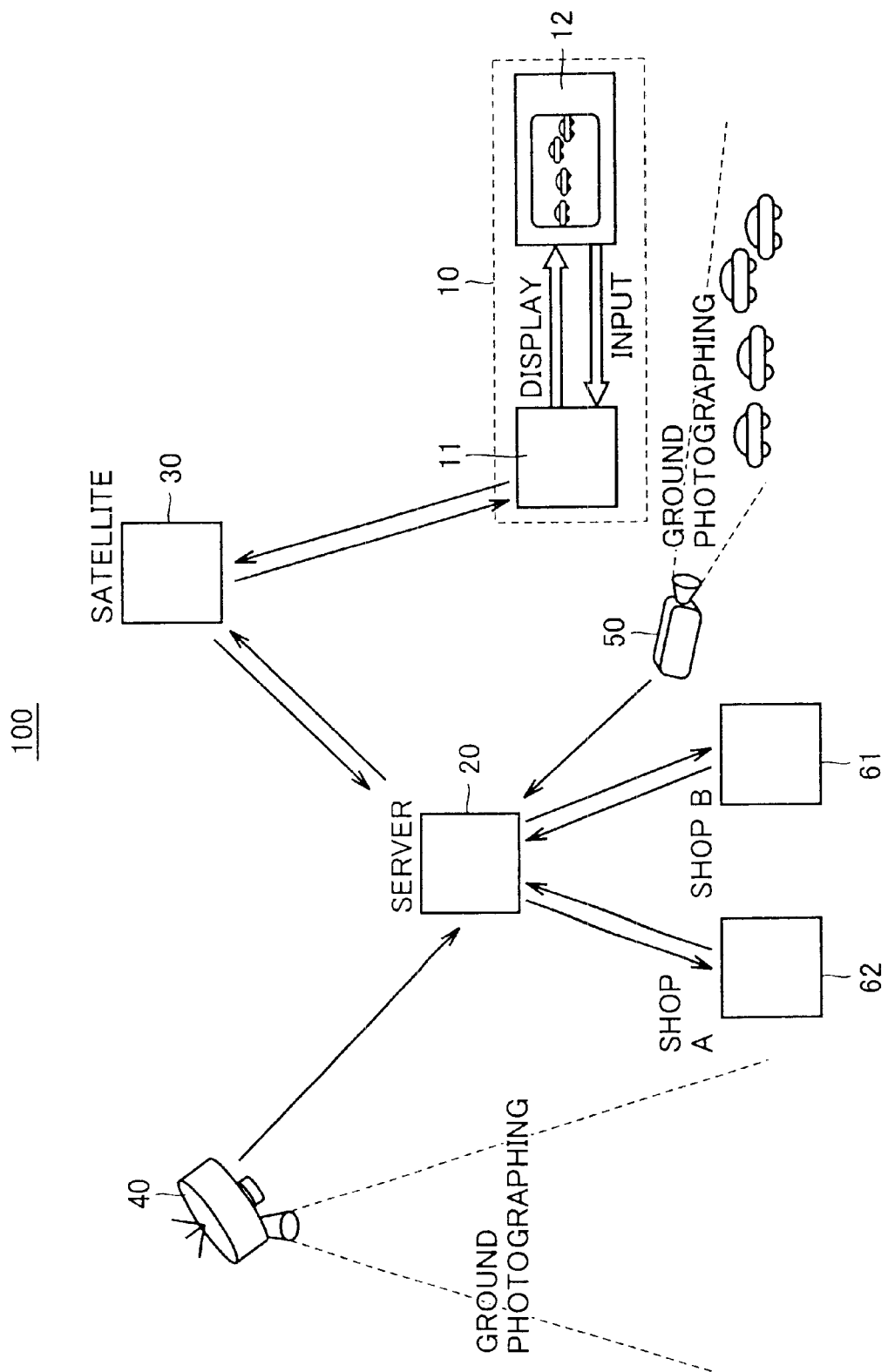
FIG. 1 is a schematic block diagram showing a navigation system in a first embodiment according to the present invention.

FIG. 1 is a schematic block diagram of a navigation system in the first embodiment according to the present invention. Referring to FIG. 1, a navigation system 100 is comprised of a navigator 10, a server 20, satellites 30 and 40, and a camera 50. The navigator 10 includes a main body unit 11 and a display unit 12.

The satellite 40 photographs ground pictures at certain time intervals and transmits the photographed pictures to the server 20. The ground pictures are photographs representing ground states and particularly photographs representing road traffic states, photographs of the surrounding of shops and the like. The camera 50 is similar to a monitor camera disposed on a road. The camera 50 photographs road traffic states at certain time intervals and transmits the photographed road traffic states to the server 20. The shops 61 and 62 photograph the crowded states of the shops and the states of displayed articles and the like in the shops by cameras (not shown), respectively.

The server 20 receives the road traffic states, the photographs around the shops, the states of the shops and the like from the satellite 40, the camera 50 and the shops 61 and 62, and holds them as real-time information in a database (not shown). Then, if the server 20 receives positional information including the client's present position, traveling direction, the position of client's destination and the like from a client's navigator 10, the server 20 extracts real-time information within a certain range which information includes the client's present position from the database by a method, to be described later, and transmits the real-time information to the navigator 10 through the satellite 30. Also, if receiving a restaurant reservation request from the navigator 10, the server 20 executes the restaurant reservation and transmits the execution result to the navigator 10 through the satellite 30.

The navigator 10 detects the client's present position by a GPS signal from the satellite 30 and transmits positional information such as the detected present position and the client's traveling direction to the server 20 through the satellite 30. Further, the navigator 10 displays the real-time information within the certain range received through the satellite 30 on the display unit 12. Moreover, if the client checks the crowded state of the restaurant displayed on the display unit 12 and inputs a request to make a reservation at the restaurant, the navigator 10 transmits the reservation request to the server 20 through the satellite 30. Further, if the client designates the range of real-time information displayed on the display unit 12, the server 20 extracts the real-time information within the designated range from the received real-time information and displays the extracted real-time information.

As can be seen, the navigator 10 receives ground real-time information within the certain range including the client's present position from the server 20 through the satellite 30 and displays the received real-time information on the display unit 12. The client can, therefore, select another road while looking at the displayed road state, make a reservation at a restaurant which is not crowded to take a meal or do other things.

Figure 2:
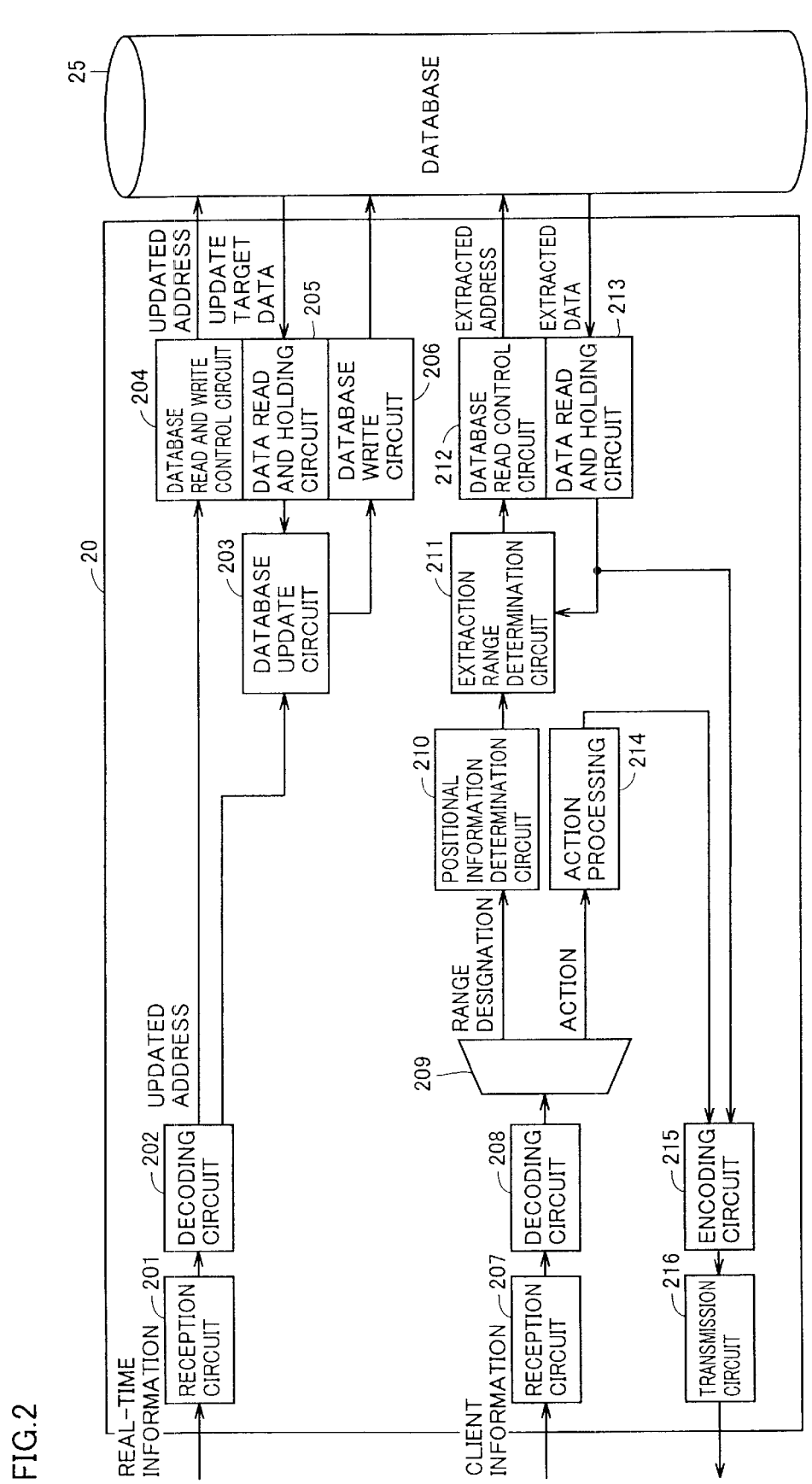
FIG. 2 is a functional block diagram of a server shown in FIG. 1.

FIG. 2 is a functional block diagram of the server 20 shown in FIG. 1. Referring to FIG. 2, the server 20 includes reception circuits 201 and 207, decoding circuits 202 and 208, a database update circuit 203, a database read and write control circuit 204, data read and holding circuits 205 and 213, a database write circuit 206, a range designation/action selection circuit 209, a positional information determination circuit 210, an extraction range determination circuit 211, a database read control circuit 212, an action processing circuit 214, an encoding circuit 215 and a transmission circuit 216.

The reception circuit 201 receives encoded information from the satellite 40 or the camera 50. The encoded information includes the real-time information photographed by the satellite 40 or the camera 50 and the address of the inputted information for writing the real-time information in the database 25. The decoding circuit 202 decodes the encoded information, acquires the real-time information and the address of the inputted information, outputs the address of the inputted information to the database read and write control circuit 204 and outputs the real-time information to the database update circuit 203.

The database read and write control circuit 204 controls the database 25 to read real-time information stored at the same address as the address of the inputted information inputted from the decoding circuit 202. The data read and holding circuit 205 holds the real-time information read from the database 25 and outputs the real-time information to the database update circuit 203.

The database update circuit 203 updates the real-time information inputted from the data read and holding circuit 205 using the real-time information inputted from the decoding circuit 202 and outputs the updated real-time information to the database write circuit 206. The database write circuit 206 overwrites the updated real-time information on the read real-time information. By doing so, the real-time information stored in the database 25 is updated.

The reception circuit 207 receives encoded information from the navigator 10 or the shops 61 and 62. The encoded information includes range designation information for designating a range in which the client wants to receive information or an action such as a reservation which the client requests to the server 20. The decoding circuit 208 decodes the encoded information and outputs the decoded information to the range designation/action selection circuit 209. The range designation/action selection circuit 209 outputs the received information to the positional information determination circuit 210 if the received information falls within the designated range, and outputs the received information to the action processing circuit 214 if the received information is an action.

The positional information determination circuit 210 determines positional information used to determine an information extraction range. That is, since various information such as the present position, destination, traveling direction, moving time and basic setting range of the client is transmitted as the range designation information from the navigator 10, information for determining the information extraction range is determined from these pieces of information. The extraction range determination circuit 211 determines an information extraction range which is a range for extracting information based on the information determined by the positional information determination circuit 210. A method of determining the information extraction range will be described later.

The database read control circuit 212 inputs the address of the real-time information which falls within the information extraction range and which has been inputted from the extraction range determination circuit 211 to the database 25 and controls the database 25 so as to output the real-time information stored at the address in the database 25. The data read and holding circuit 213 holds the real-time information read from the database 25 and outputs the real-time information to the extraction range determination circuit 211 or the encoding circuit 215.

The action processing circuit 214 outputs information for executing the action requested by the navigator 10 to the encoding circuit 215. The encoding circuit 215 encodes the information from the data read and holding circuit 213 or the action processing circuit 214 and outputs the encoded information to the transmission circuit 216. The transmission circuit 216 transmits the encoded information to the satellite 30 or the shops 61 and 62.

Figure 3:
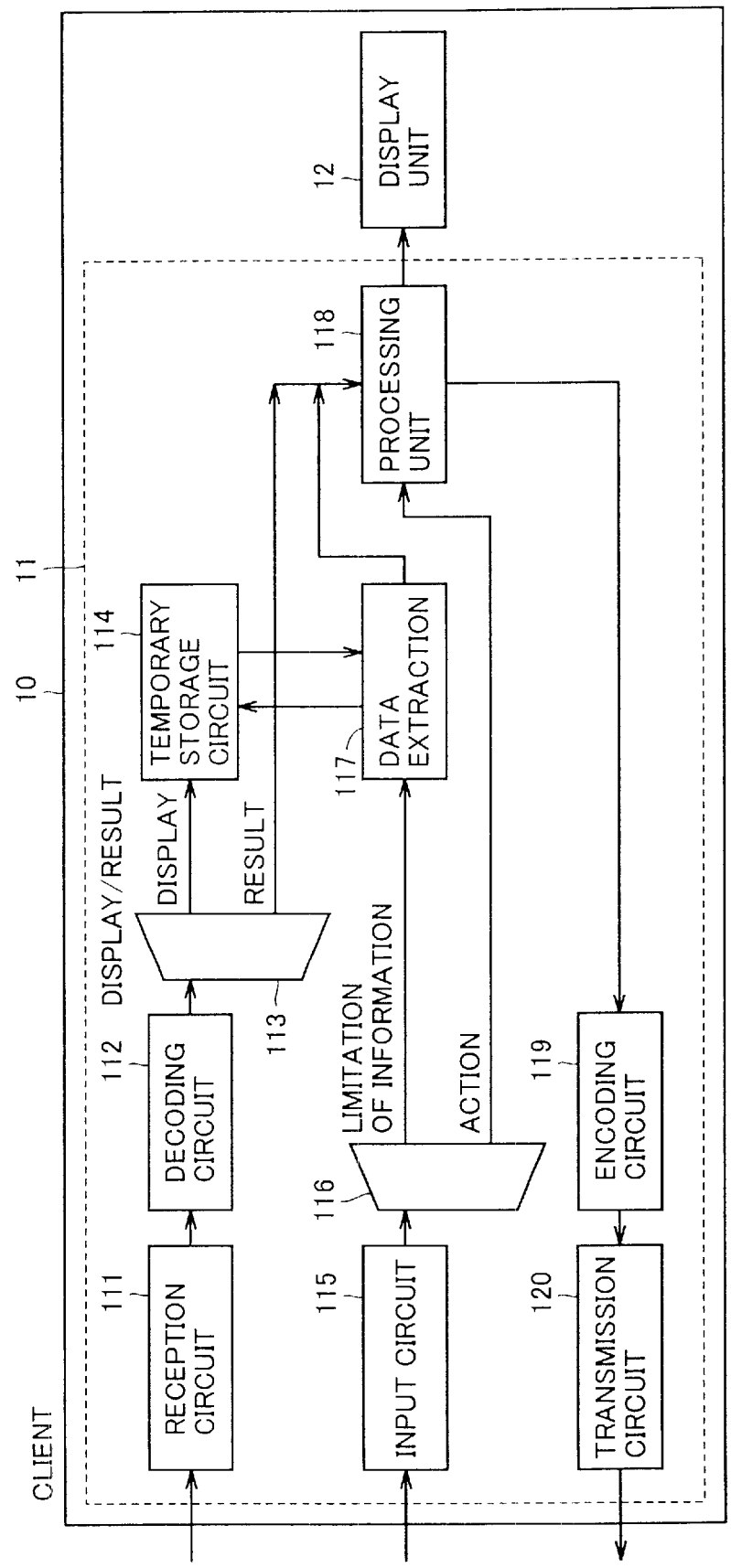
FIG. 3 is a functional block diagram of a navigator shown in FIG. 1.

FIG. 3 is a functional block diagram of the navigator 10. Referring to FIG. 3, the main body unit 11 of the navigator 10 includes a reception circuit 111, a decoding circuit 112, a display/result selection circuit 113, a temporary storage circuit 114, an input circuit 115, an information designation/action selection circuit 116, a data extraction circuit 117, a processing unit 118, an encoding circuit 119 and a transmission circuit 120.

The reception circuit 111 receives encoded information from the satellite 30. The encoded information includes real-time information transmitted from the server 20, the action result of the server 20 such as a reservation, and the like. The decoding circuit 112 decodes the encoded information. The display/result section circuit 113 outputs the information inputted from the decoding circuit 112 to the temporary storage circuit 114 if the information inputted from the decoding circuit 112 is real-time information and outputs the information to the processing unit 118 if the information inputted from the decoding circuit 112 is an action result.

The temporary storage circuit 114 temporarily stores the real-time information inputted from the display/result selection circuit 113 and outputs the real-time information to the data extraction circuit 117 in accordance with a data read request from the data extraction circuit 117. The input circuit 115 receives an input from the client. The input includes information designation for further limiting and extracting the real-time information received from the server 20, an action such as a reservation, or the like. The information designation/action selection circuit 116 outputs the information from the input circuit 115 to the data extraction circuit 117 if the information from the input circuit 115 is information designating information and outputs the information from the input circuit 115 to the processing unit 118 if the information from the input circuit 115 is an action such as a reservation.

The data extraction circuit 117 receives the information designating information from the information designation/action selection circuit 116, extracts real-time information which falls within the range designated by the information designating information from the temporary storage circuit 114 and outputs the extracted real-time information to the processing unit 118. If the information designation from the information designation/action selection circuit 116 is to designate the same range as that of the real-time information received from the server 20, the data extraction circuit 117 extracts the real-time information stored in the temporary storage circuit 114 as it is and outputs the extracted information to the processing unit 118.

The processing unit 118 outputs the action result from the display/result selection circuit 113 or the real-time information from the data extraction circuit 117 to the display unit 12. Also, if the client inputs an action such as a restaurant reservation to the input circuit 115 based on the real-time information displayed on the display unit 12, the processing unit 118 receives the action such as a reservation through the information designation/action selection circuit 116 and outputs a request to execute the action such as a reservation, the name of the restaurant at which the client wants to make a reservation and the like to the encoding circuit 119.

The encoding circuit 119 encodes the information from the processing unit 118 and outputs the encoded information to the transmission circuit 120. The transmission circuit 120 transmits the encoded information encoded by the encoding circuit 119 to the satellite 30.

Although not shown in FIG. 3, the navigator 10 includes a position measuring equipment for receiving a GPS signal from the satellite 30 and measuring the position of the navigator 10 itself, and a memory storing map information.

Figure 4:
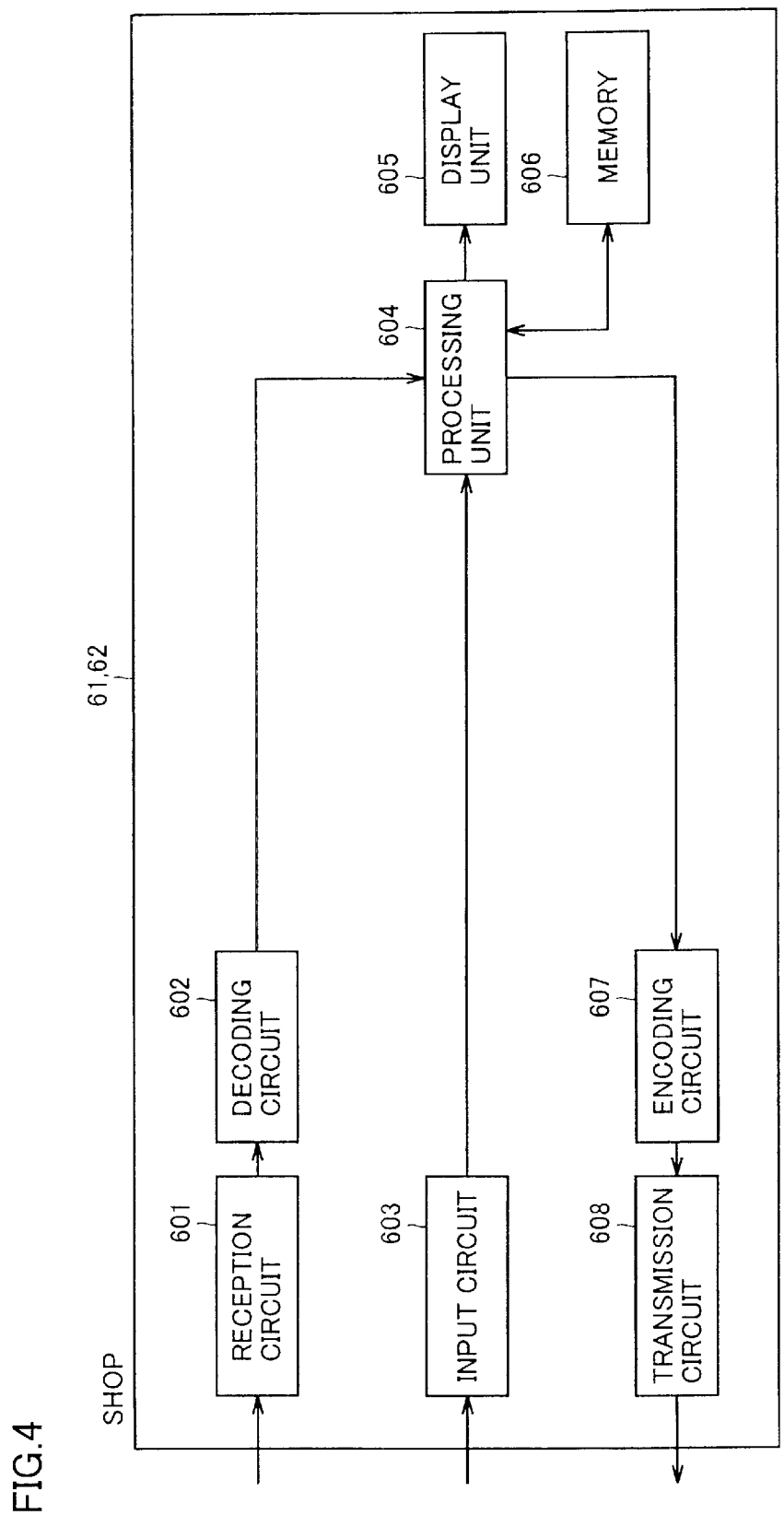
FIG. 4 is a functional block diagram of a terminal unit disposed in a shop shown in FIG. 1.

FIG. 4 is a functional block diagram of a terminal unit disposed in each of the shops 61 and 62 shown in FIG. 1. Referring to FIG. 4, the terminal unit of each of the shops 61 and 62 includes a reception circuit 601, a decoding circuit 602, an input circuit 603, a processing unit 604, a display unit 605, a memory 606, an encoding circuit 607 and a transmission circuit 608.

The reception circuit 601 receives encoded information from the server 20. The encoded information includes a request to make a reservation at the shop, a selected article, a credit card number for settling a charged price for the article and the like. The decoding circuit 602 decodes the encoded information. The input circuit 603 receives an input such as an instruction. If the information from the decoding circuit 602 is a shop reservation, the processing unit 604 reads a reservation table stored in the memory 606 and judges whether or not the setting of the requested reservation is possible. If possible, the processing unit 604 sets the requested reservation on the reservation table, stores the table in the memory 606 and displays the requested reservation on the display unit 605. As a result, the owner of the shop is informed that a new reservation has been set. Then, the processing unit 604 outputs a result indicating that the reservation has been set to the encoding circuit 607. On the other hand, if the requested reservation cannot be set, the processing unit 604 outputs the result to the encoding circuit 607.

Further, if credit card number information is inputted, the processing unit 604 carries out the same processing as that for shopping with a credit card, based on the price and the credit card number from the input circuit 603, and outputs the processing result to the encoding circuit 607. In addition, if selected article information is inputted, the processing unit 604 outputs the article information on the display unit 605.

The display unit 605 displays the information inputted from the processing unit 604. The memory 606 stores various information such as the reservation table. The encoding circuit 607 encodes the information from the processing unit 604 and outputs the encoded information to the transmission circuit 608. The transmission circuit 608 transmits the encoded information to the server 20.

It is noted that each of the shops 61 and 62 includes a camera for photographing the state of the shop. The picture taken by the camera is received by the reception circuit 601, and transmitted to the server 20 by way of the decoding circuit 602, the processing unit 604, the encoding circuit 607 and the transmission circuit 608.

Figure 5:
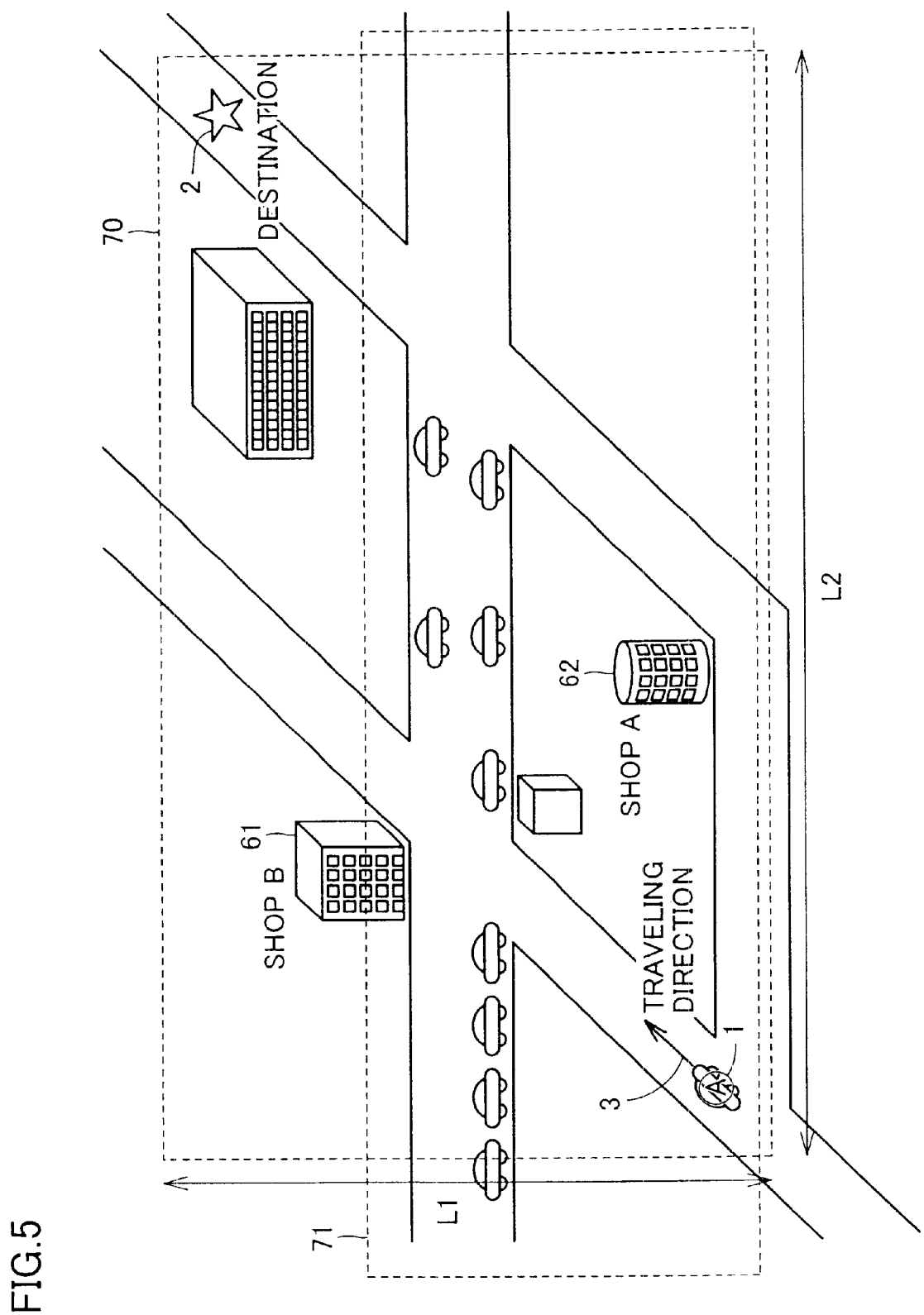
FIG. 5 is a view for describing a range for extracting real-time information.

Referring to FIG. 5, description will be given to a method of determining an information extraction range by the extraction range determination circuit 211 of the server 20 shown in FIG. 2. The client travels in the traveling direction 3 by a vehicle 1. The client finally arrives at a destination 2. If the present position of the vehicle 1 and the destination 2 are transmitted from the navigator 10 mounted on the vehicle 1 to the server 20, the extraction range determination circuit 211 recognizes that a basic range 70 has been inputted and determines the basic range 70 as an information extraction range. The basic range 70 includes the present position and the destination 2. The basic range 70 is a rectangular range having a length L1 in an x-axis direction and a length L2 in a y-axis direction orthogonal to the x axis. It is noted that the states of the shops 61 and 62, the road traffic information around the shops 61 and 62, the traffic states of the respective roads between the present position of the vehicle 1 and the destination 2 and the like are referred to as real-time information included in the basic range 70.

Further, if the present position of the vehicle 1 and the traveling direction 3 of the vehicle 1 are inputted from the navigator 10, the extraction range determination circuit 211 sets an information extraction range 71 different from the basic range 70 on a map. The information extraction range 71 is a range which includes the present position and which is determined by a distance proportional to an x-direction component and a y-direction component into which a vector representing the traveling direction 3 is decomposed. Therefore, if the information extraction range 71 is set, real-time information different from that in the basic range 70 is transmitted to the navigator 10.

Furthermore, if the present position and moving time of the client are inputted from the navigator 10, the extraction range determination circuit 211 acquires the moving speeds on the respective roads to which the client's vehicle can travel from the present position from the database 25 through the data read and holding circuit 213. Then, based on the moving time inputted from the navigator 10 and the moving speed acquired from the database 25, the extraction range determination circuit 211 performs an arithmetic operation of a moving distance by which the client's vehicle can move within a moving time, and sets the information extraction range on a map using the operated moving distance. In this case, the vehicle has different moving speeds on the respective roads depending on the congested degree of the roads. Due to this, the information extraction range is not a rectangular range but a range having a large distance in the x-axis direction and a small distance in the y-axis direction.

In this way, the extraction range determination circuit 211 sets various types of information extraction ranges based on the information on the client position from the navigator 10. The basic range 70 and the information extraction range 71 are ranges on the map. However, since an address for reading real-time information on the shops 61, 62 and the like from the database is to be extracted, the basic range 70 and the information extraction range 71 are substantially ranges for extracting information.

The server 20 transmits the real-time information which falls within the basic range 70 or the information extraction range 71. In this case, the server 20 transmits real-time information having the largest data quantity over communications through the satellite 30. No problems occur if the real-time information which falls within the basic range 70 or the information extraction range is small in data quantity. If the real-time information which falls within the basic range 70 or the information extraction range 71 is large in data quantity, all of the real-time information cannot be possibly transmitted. To transmit the real-time information as much as possible to the navigator 10 of the client, the server 20 is designed to transmit real-time information with the largest data quantity.

Figure 6:
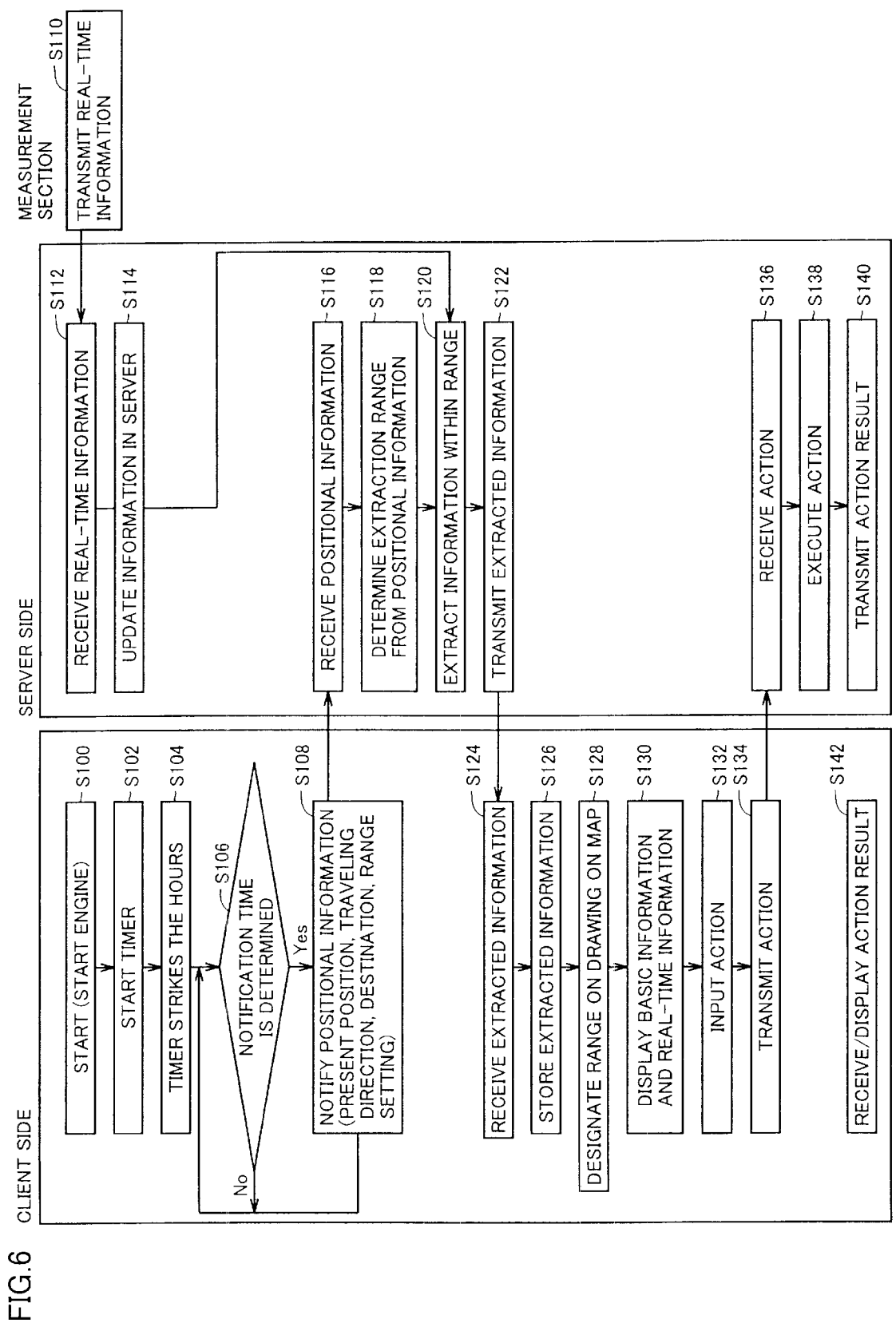
FIG. 6 is a flow chart for describing the operations of the navigation system shown in FIG. 1.

FIG. 6 is a flow chart for describing the operations of the navigation system 100 shown in FIG. 1. Referring to FIG. 6, when the client starts the engine of the vehicle 1 (step S100), a timer (not shown) is turned on and time measurement is started (step S102). The engine of the vehicle 1 is started by the detection of rotation speed, the detection of oil pressure or the like. The timer strikes the hours (step S104) and it is judged whether or not a fixed time has passed since the engine was started (step S106). If it is judged that the fixed time has not passed in the step S106, the step S106 is repeated. If it is judged that the fixed time has passed in the step S106, the navigator 10 detects the present position of the vehicle 1 by means of a position measuring equipment (not shown) and transmits positional information such as the present position, the destination 2, the traveling direction 3 and the range setting to the server 20 through the satellite 30 (step S108).

On the other hand, the satellite 40 or the camera 50 photographs a ground state and transmits the photographed real-time information to the server 20 (step S110). The reception circuit 201 of the server 20 receives the real-time information (step S112). The received real-time information is written to the database 25 through the decoding circuit 202, the database update circuit 203 and the database write circuit 206 as stated above (step S114). As a result, the real-time information in the database 25 is updated. Since the satellite 40 or the camera 50 transmits real-time information photographed at certain time intervals to the server 20, the real-time information in the database 25 is updated at the certain time intervals. Alternatively, the navigation system may be constituted so that every time the server 20 receives a real-time information transmission request from the client, the server 20 requests real-time information to the satellite 40 or the camera 50 and the real-time information in the database 25 is updated.

After the steps S108 and S114, the positional information from the navigator 10 is received by the reception circuit 207 of the server 20 (step S116). The positional information determination circuit 210 determines information for determining an information extraction range based on the positional information from the range designation/action selection circuit 209 and outputs the determined information to the extraction range determination circuit 211. The extraction range determination circuit 211 determines the information extraction range by the above-stated method based on the inputted positional information and outputs the determined information extraction range to the data read control circuit 212. The data read control circuit 212 sets the inputted information extraction range to the map information stored in the database, reads an address for reading the real-time information such as road traffic states from the map information, and outputs the read address to the database 25. For example, if the basic range 70 is inputted as the information extraction range, the data read control circuit 212 reads an address for reading the states of the shops 61 and 62 included in the basic range 70, the traffic states of the roads around the shops 61 and 62, and the traffic states of respective roads from the present position of the vehicle 1 to the destination 2 from the database 25, from the map information, and outputs the address to the database 25. The data read and holding circuit 213 reads the real-time information stored at the address inputted by the database read control circuit 212 to the database 25 (step S120). The data read and holding circuit 213 outputs the read real-time information to the encoding circuit 215. The encoding circuit 215 adds a header which the navigator 10 transmitting the positional information can identify, to the real-time information and then encodes the header-added real-time information. The transmission circuit 216 transmits the encoded information through the satellite 30 at random (step S122).

The reception circuit 111 of the navigator 10 receives the encoded information from the server 20 through the satellite 30 (step S124). The received encoded information is decoded by the decoding circuit 112, inputted to the temporary storage circuit 114 through the display/result selection circuit 113 and stored in the temporary storage circuit 114 (step S126). In this case, the reception circuit 111 identifies the encoded information transmitted to the navigator 10 using the header added to the real-time information by the server 20. Since the display unit 12 of the navigator 10 displays a map, the client inputs range designation information for further limiting the real-time information and extracting the limited information while looking at the displayed map to the input circuit 115 (step S128). In this case, the client may input individual designation information for individually designating a restaurant, a theater, a shop or the like on the map to the input circuit 115.

Figure 7:
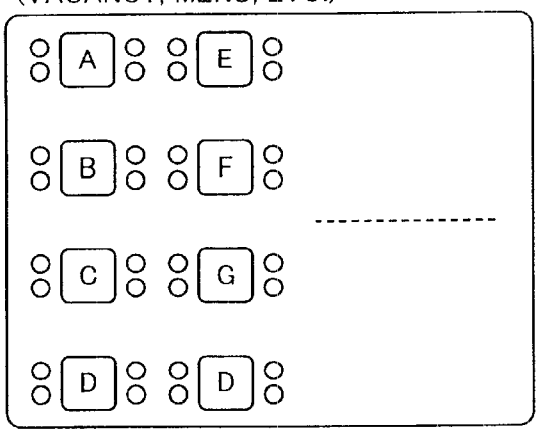
FIG. 7 is a view showing the vacancy state of a shop.

Then, the data extraction circuit 117 extracts real-time information within the range designation information (or individual designation information) inputted from the input circuit 115 from the real-time information received from the server 20 by the above-stated method and outputs the extracted real-time information to the processing unit 118. The processing unit 118 displays the inputted real-time information on the display unit 12 (step S130). If the real-time information displayed on the display unit 12 is a road traffic state, the client can instantly judge whether or not to select another road by looking at the traffic state. The client looks at the real-time information displayed on the display unit 12 of the navigator 10 and inputs an action to the input circuit 115 (step S132). If the real-time information displayed on the display unit 12 is, for example, the vacancy state and reservation menu of a restaurant as shown in FIG. 7, the client looks at the vacancy state and the reservation menu and inputs a request to make a reservation at the restaurant to the input circuit 115 so as to have a meal at the restaurant. To facilitate understanding, description will be given hereinafter while taking an operation for making a reservation at a restaurant as an example. The processing unit 118 receives a restaurant reservation request through the information designation/action selection circuit 116 and outputs the reservation request, the name of a restaurant at which a reservation is to be made, a client's name and the like to the encoding circuit 119. The encoding circuit 119 encodes the reservation request and the like and outputs the encoded reservation request and the like to the transmission circuit 120. The transmission circuit 120 transmits the encoded reservation request and the like to the server 20 through the satellite 30 (step S134).

The reception circuit 207 of the server 20 receives the encoded reservation request and the like from the navigator 10 (step S136) and outputs them to the decoding circuit 208. The decoding circuit 208 decodes the inputted information and outputs the reservation request and the like to the range designation/action selection circuit 209. If recognizing that the inputted information is an action, the range designation/action selection circuit 209 outputs the reservation request and the like to the action processing circuit 214. The action processing circuit 214 transmits the reservation request and the client's name to the restaurant 61 (or 62) the name of which is received from the navigator 10 through the encoding circuit 215 and the transmission circuit 216. Then, the reception circuit 601 of the restaurant 61 (or 62) receives the reservation request and the like and outputs them to the decoding circuit 602. The decoding circuit 602 decodes the information from the reception circuit 601, acquires the reservation request and the client's name and outputs them to the processing unit 604. If receiving the reservation request and the client's name, the processing unit 604 reads the reservation table from the memory 606 and judges whether or not a reservation can be newly set. If the reservation can be set, the processing unit 604 sets the reservation on the reservation table, stores the reservation table in the memory 606 and, at the same time, displays on the display unit 605 that a new reservation has been set. Also, the processing unit 604 outputs a result showing the setting of the reservation to the encoding circuit 607. The encoding circuit 607 encodes the result and outputs the encoded result to the transmission circuit 608. The transmission circuit 608 transmits the encoded result to the server 20. In the server 20, the encoded result is inputted to the action processing circuit 214 through the reception circuit 207, the decoding circuit 208 and the range designation/action selection circuit 209. The action processing circuit 214 transmits the received result to the navigator 10 through the encoding circuit 215 and the transmission circuit 216. As a result, the client is informed that a restaurant reservation can be made. Even if the processing unit 604 of the shop 61 (or 62) judges that a reservation cannot be taken, the result is transmitted to the navigator 10 by the same operation as the above-stated operation. In this way, the reservation inputted by the client is executed (step S138) and the result is transmitted to the client (step S140). The reception circuit 111 of the navigator 10 receives the result of the action such as a reservation. The received result is displayed on the display unit 12 through the decoding circuit 112, the display/result selection circuit 113 and the processing unit 118 (step S142).

Figure 8A:
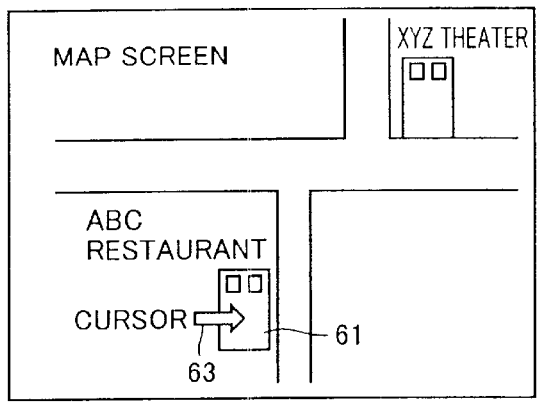
FIGS. 8A to 8D are views for describing making a reservation at the shop in the first embodiment.

If the client selects a restaurant on a screen displayed on the display unit 12, the client accords a cursor 63 with an ABC restaurant 61 and clicks on the cursor 63 as shown in FIG. 8A. Then, the ABC restaurant 61 is selected and information indicating the ABC restaurant 61 has been selected is inputted to the processing unit 118, thereby providing information for making a reservation. If the client clicks on the ABC restaurant 61, the display screen of the display unit 12 is switched to a screen shown in FIG. 8B, the client can look at the vacancy information (present state and forecast) on the ABC restaurant 61. For reservations, the client inputs the number of persons, a seat (indicated by a symbol such as A, B, C, . . . shown in FIG. 7), a menu to be ordered and the like from the input circuit 115. By doing so, the client can make a reservation at the ABC restaurant 61.

Figure 8C:
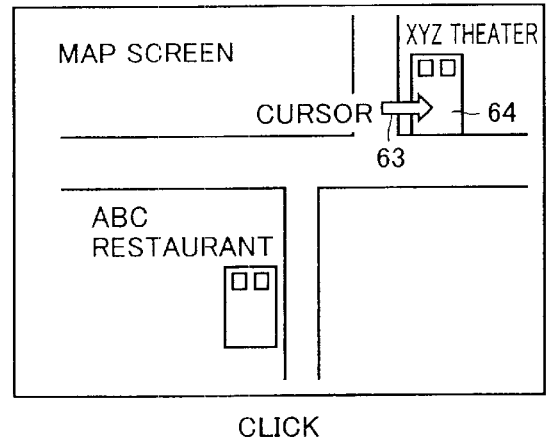
Figure 8B:
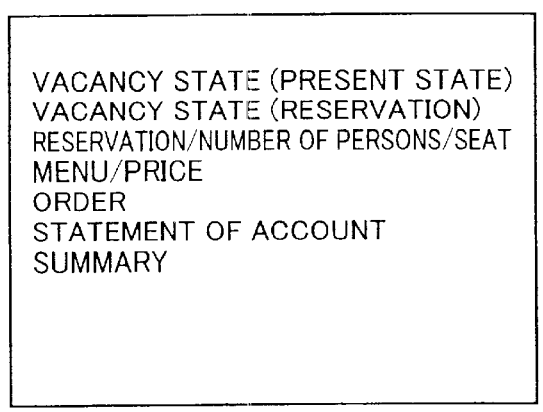
Figure 8D:
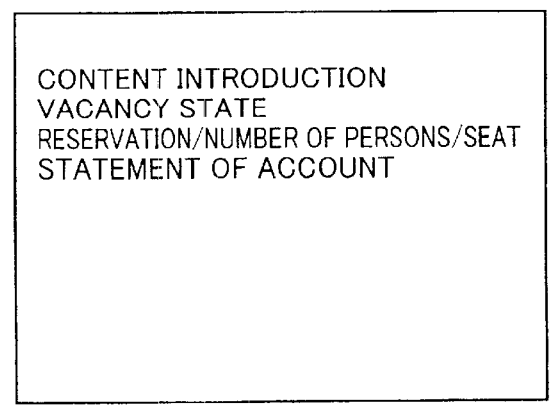

Besides the restaurant reservation, a theater reservation can be made by the same method as that for the restaurant reservation. As shown in FIG. 8C, the cursor 63 is accorded with an XYZ theater 64 and clicked on, the screen shown in FIG. 8C is switched to a screen shown in FIG. 8D and the introduction of contents such as the title of a movie now on at the XYZ theater 64 and a vacancy state are displayed on the display unit 12. The client, therefore, inputs the number of persons and a seat (or seats) from the input circuit 115 while looking at the screen of the display unit 12, thereby making a reservation at the XYZ theater 64.

Furthermore, the client can pay the price of the reserved meal to the restaurant or the ticket price of the reserved movie to the theater at the time of making a reservation on the vehicle 1. In that case, the client inputs the client's credit card number to the input circuit 115 of the navigator 10. The inputted credit card number is transmitted to the restaurant or the theater through the server 20 by the above-stated method. The processing unit 604 of the restaurant or the theater carries out a price payment processing based on the credit card number and transmits the processing result to the navigator 10 by the above-state method.

In addition, the execution of the action shown in the step S138 of FIG. 6 should not be limited to the restaurant or theater reservation. An operation for receiving information on articles displayed at a certain shop as real-time information and purchasing a selected article based on the real-time information may be executed.

As already stated above, using the navigation system 100, the client can be informed of the traffic states in the traveling direction in a real-time manner while moving by vehicle and instantly judge whether or not to select another road based on the real-time information. The client can also make a reservation at a restaurant or the like or purchase an article while moving by vehicle, thereby making it possible to shorten wait time since the client arrives at the restaurant and a meal is served or wait time since the client arrives at the shop by the client receives the article can be shortened.

According to the first embodiment, the server transmits the traffic states of roads in the traveling direction, the shop states and the like as real-time information to the client's navigator and executes a reservation such as a restaurant reservation in response to a client's reservation request such as a restaurant reservation request and transmits the result to the client's navigator. The client can, therefore, instantly make a judgment based on the real-time information.

[Second Embodiment]

Figure 9:
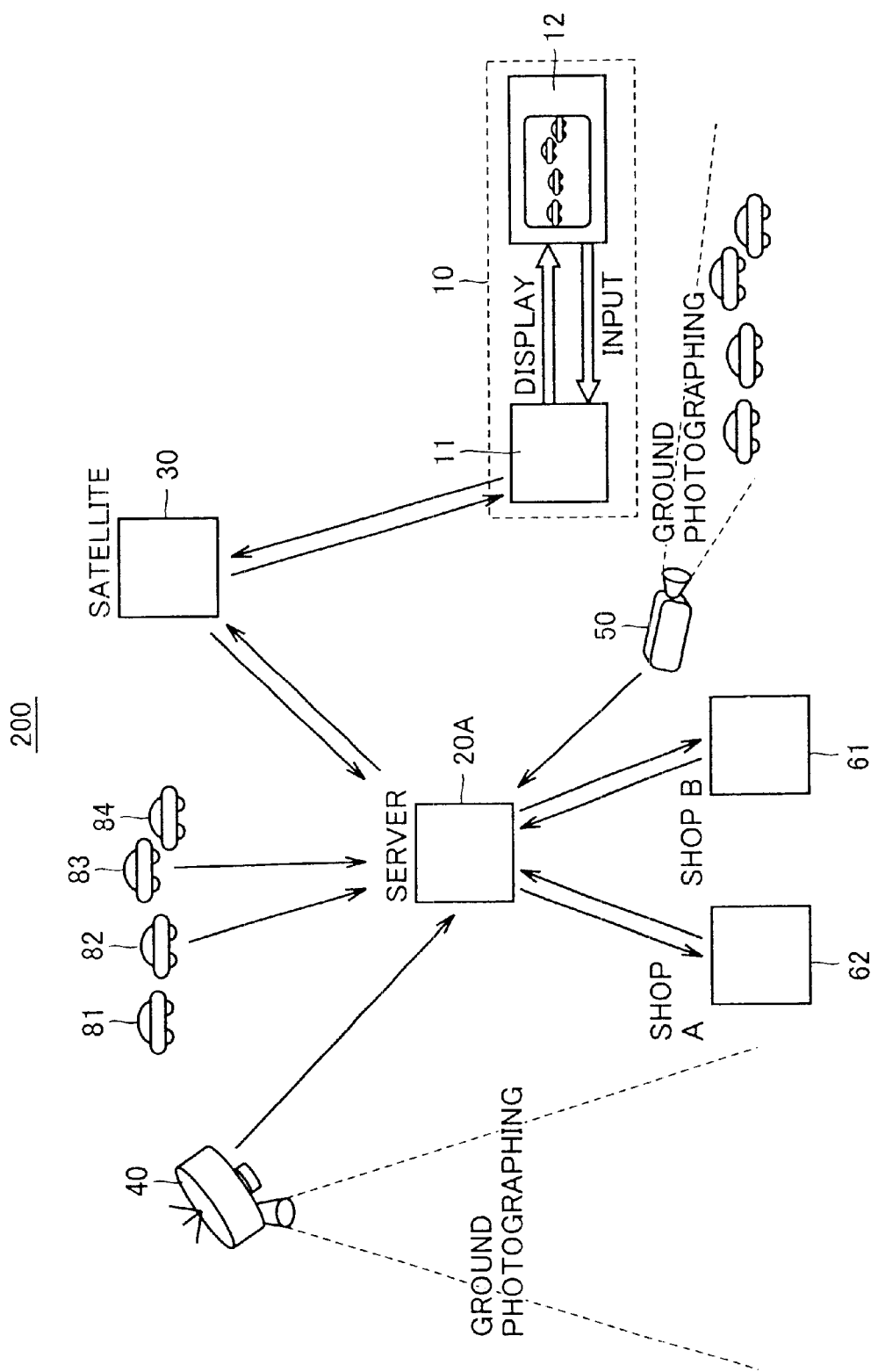
FIG. 9 is a schematic block diagram showing a navigation system in a second embodiment according to the present invention.

FIG. 9 is a schematic block diagram of a navigation system in the second embodiment of the present invention. Referring to FIG. 9, a navigation system 200 is the same as the navigation system 100 except that a plurality of clients' vehicles 81 to 84 are added to the navigation system 100 shown in FIG. 1 and that the server 20 is replaced by a server 20A.

A navigator to be described later is mounted on each of the vehicles 81 to 84. The navigator transmits information on the electrical systems of each of the vehicles 81 to 84, information on histories and the like to the server 20A. Therefore, the server 20A collects ground real-time information from the plural clients' vehicles 81 to 84 in addition to a satellite 40 and a camera 50 and transmits the real-time information to the navigator 10 of a client who requests.

Figure 10:
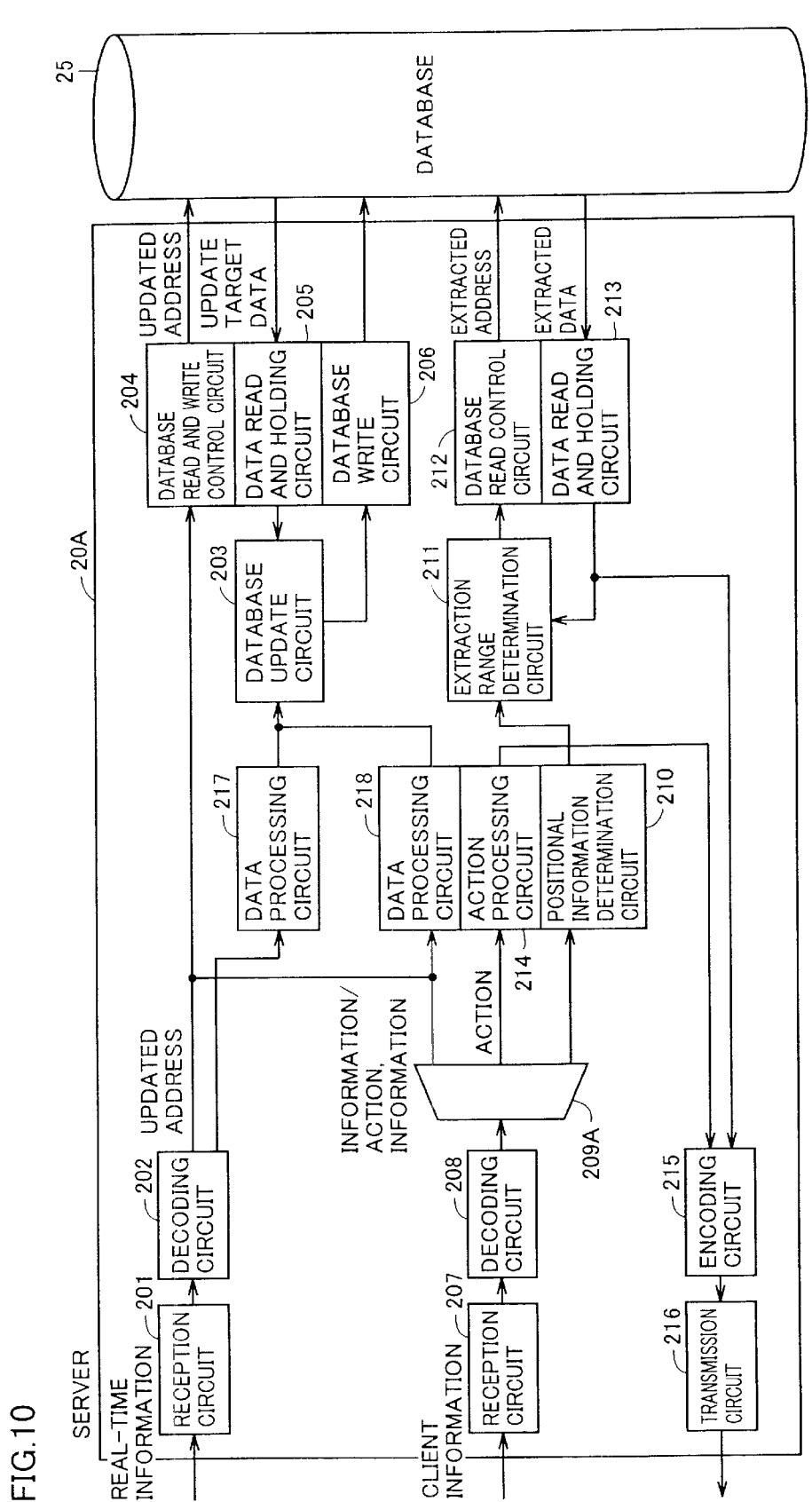
FIG. 10 is a functional block diagram of a server shown in FIG. 9.

FIG. 10 is a functional block diagram of the server 20A shown in FIG. 9. The server 20A is the same as the server 20 shown in FIG. 2 except that data processing circuits 217 and 218 are added to the server in the functional block diagram of the server 20 shown in FIG. 2 and that the range designation/action selection circuit 209 is replaced by an information/action selection circuit 209A.

The information/action selection circuit 209A discriminates an action such as a reservation request, positional information from the navigator 10 and real-time information from the navigators mounted on the respective vehicles 81 to 84, outputs the action such as a reservation request to an action processing circuit 214, outputs the positional information to a position determination circuit 210, outputs the address of the real-time information from the navigators mounted on the respective vehicles 81 to 84 to a database read and write control circuit 204 and outputs the real-time information to the data processing circuit 218.

The data processing circuit 217 processes the real-time information from the satellite 40 or the camera 50 into various types of data and outputs the processed data to a database update circuit 203. The data processing circuit 218 processes the real-time information received from the vehicles 81 to 84 into various types of data and outputs the processed data to the database update circuit 203. The database update circuit 203, therefore, updates real-time information stored in a database 25 using the real-time information received from the plural clients' vehicles 81 to 84 besides the real-time information received from the satellite 40 or the camera 50. As can be seen, the navigation system 200 in the second embodiment is characterized in that the server 20A collects the real-time information from a plurality of clients and transmits the real-time information to the navigator 10 of the client who transmits a real-time information transmission request.

The remaining features are the same as those of the server 20 shown in FIG. 2.

Figure 11:
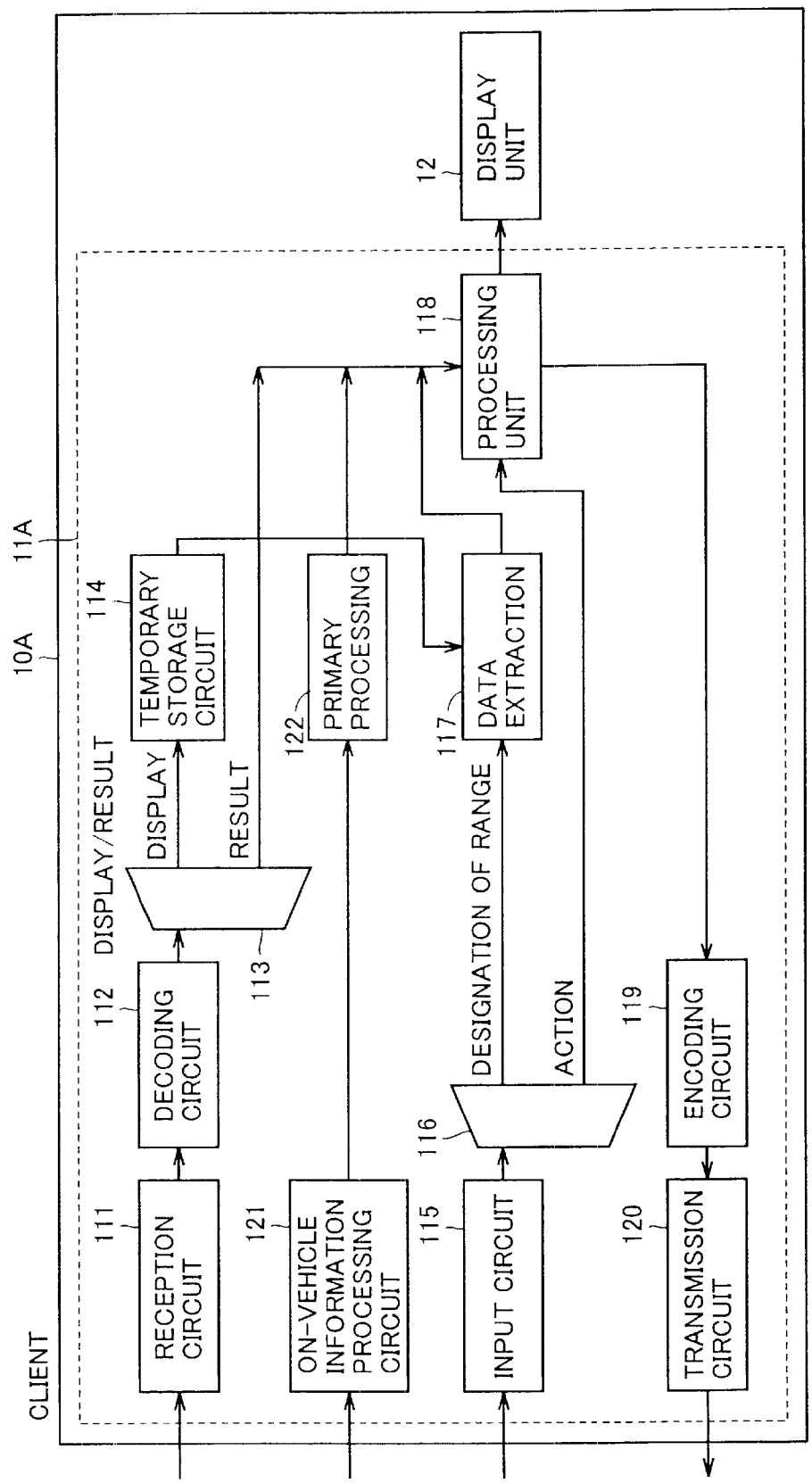
FIG. 11 is a functional block diagram of a navigator mounted on a vehicle shown in FIG. 9.

FIG. 11 is a functional block diagram of the navigator mounted on each of the vehicles 81 to 84. The navigator 10A includes a main body unit 11A and a display unit 12. The main body unit 11A is the same as the main body unit 11 shown in FIG. 3 except that an on-vehicle information circuit 121 and a primary processing circuit 122 are added to the main body unit 11 of the navigator 10 shown in FIG. 3.

The on-vehicle information circuit 121 acquires information on the electrical system, history and the like of each of the vehicles 81 to 84 from each of the vehicles 81 to 84 and outputs the acquired information to the primary processing circuit 122. The primary processing circuit 122 primarily processes information from the on-vehicle information circuit 121 and outputs the primarily-processed information to the processing unit 118. The other features of the main body unit 11A are the same as those of the main body unit 11 shown in FIG. 3.

Figure 12:
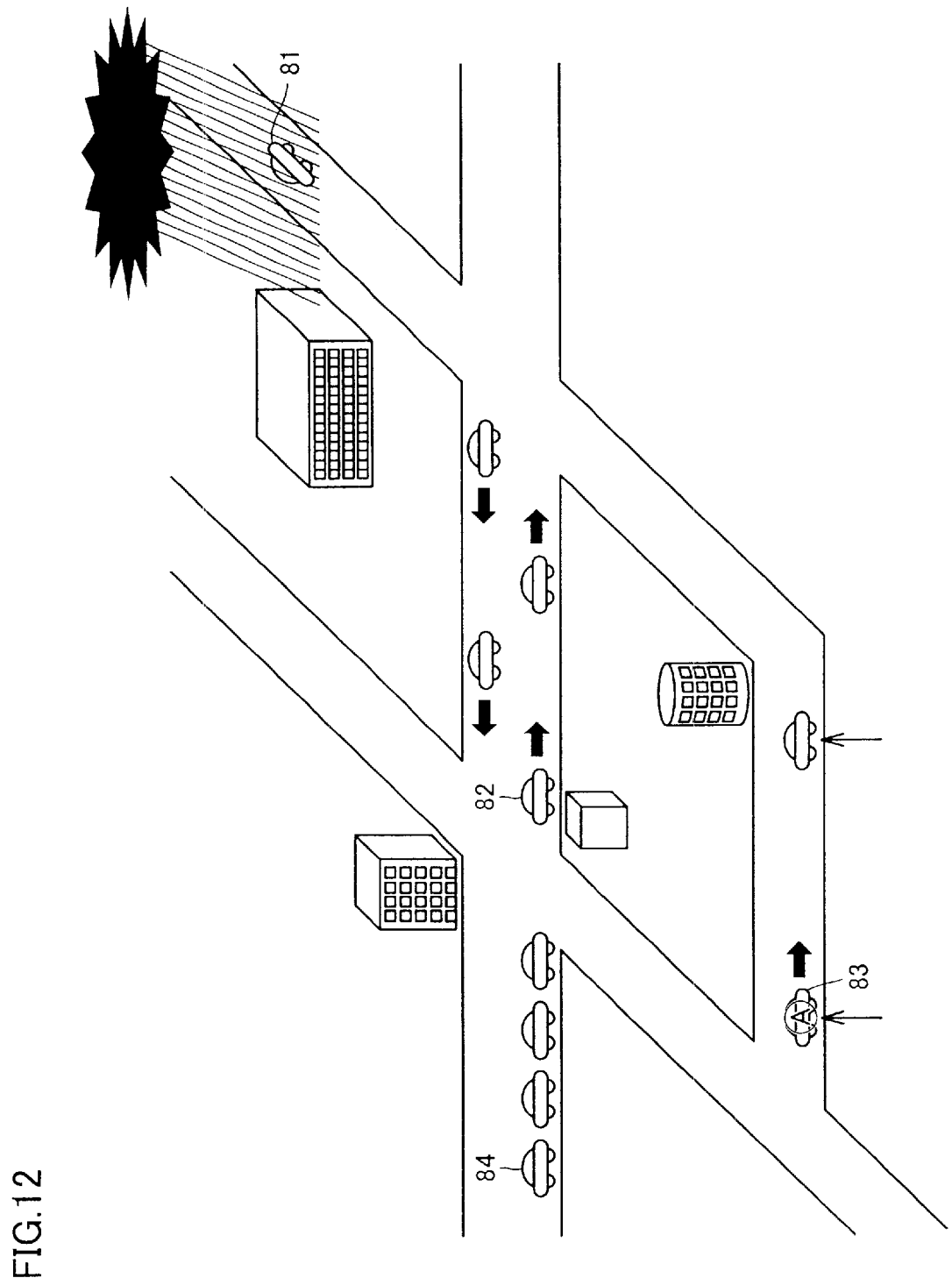
FIG. 12 is a view for describing real-time information transmitted from the navigator mounted on a client's vehicle to the server.

Real-time information transmitted from the navigators 10A mounted on the respective vehicles 81 to 84 will be described referring to FIG. 12. The navigator 10A transmits information as to whether or not the wiper of the vehicle 81 is used and wiper speed information to the server 20A. Whether or not the wiper is used shows a weather in that place and the wiper speed information shows the degree of rain or snow. Also, the navigator 10A transmits the progressive state of the distance measurer of each of the vehicles 81 to 84 to the server 20A. The progressive state of the distance measurer shows whether or not the roads on which each of the vehicles 81 to 84 is traveling are congested. The road on which the vehicle 82 is traveling is not congested but the road on which the vehicle 84 is traveling is congested. Moreover, the navigator 10A transmits the control states of ABS's (Anti-Lock Braking System) when the respective vehicles are braked to the server 20A. The control states of the ABS's show the braking degrees of the vehicles, i.e., the slipping degrees of the roads and the frozen degrees of the roads. Furthermore, the navigator 10A transmits weather and road conditions, the congested states of the roads and the like using backward checking cameras installed on the respective vehicles 81 to 84 to the server 20A.

By transmitting these pieces of real-time information to the server 20A, the server 20A can acquire more carefully thought out real-time information than the real-time information received from the satellite 40 or the camera 50 and provide better services to the respective clients by transmitting the real-time information to the other clients.

It is also possible to detect the states of the respective vehicles 81 to 84 from electronic information such as the numbers of rotations of the engines of the vehicles 81 to 84 and oil pressures, and to thereby use the detected states for preventing accidents.

Figure 13:
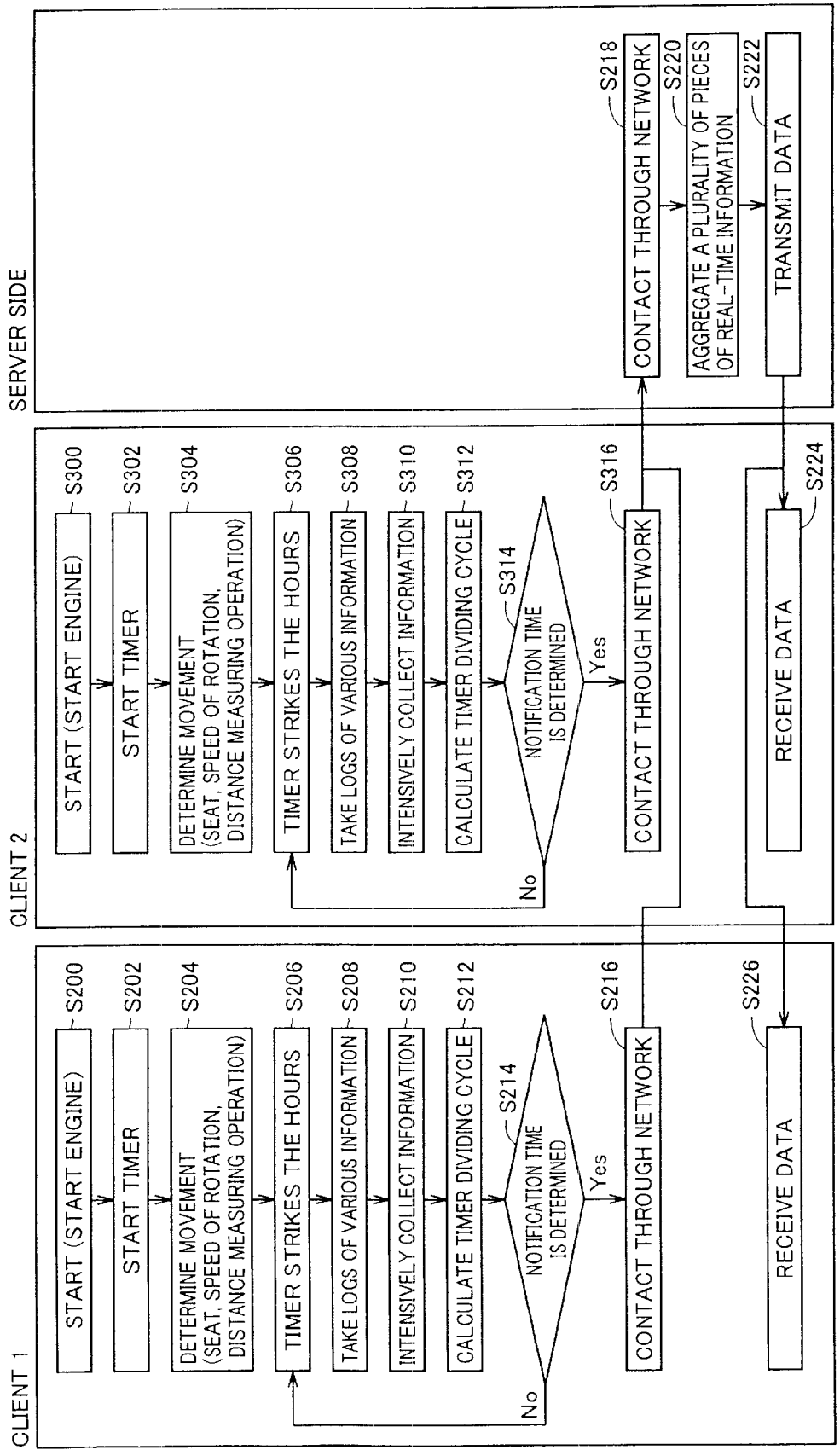
FIG. 13 is a flow chart for describing the operations of the navigation system shown in FIG. 9.

FIG. 13 is a flow chart showing the operations of the navigation system 200 in the second embodiment. Referring to FIG. 13, when the clients start the engines of their respective vehicles 81 to 84 (steps S200 and S300), timers (not shown) are turned on and time measurement starts (steps S202 and S302). The engines of the respective vehicles 81 to 84 are started by the detection of the numbers of rotation, the detection of oil pressures or the like. Using the numbers of rotation of the engines and the operations of the distance measures, the movements of the vehicles 81 to 84 are determined (steps S204 and S304) and the timers strike the hours (steps S206 and S306). Various types of history information such as whether or not wipers are used are acquired (steps S208 and S308) and information is intensively collected (steps S210 and S310). The processing unit 118 of the navigator 10A measures a timer dividing cycle, i.e., time intervals for transmitting real-time information (steps S212 and S312) and it is determined whether or not time to transmit real-time information arrives (steps S214 and S314). If the time does not arrive yet, the operation returns to the step S206 and S306 and the steps S206 to S214 and the steps S306 to S314 are repeated. If it is determined that now is the time to transmit the real-time information in the steps S214 and S314, the real-time information which has been intensively collected in the steps S210 and S310 is transmitted to the server 20A (steps S216 and S316).

The reception circuit 207 of the server 20A receives the real-time information from the navigator 10A and outputs the received real-time information to the decoding circuit 208 (step S218). The decoding circuit 208 decodes the information and outputs the decoded information to the information/action selection circuit 209A. If discriminating that the inputted information is real-time information, then the information/action selection circuit 209A extracts the address of the real-time information, outputs the extracted address to the database read and write control circuit 204 and outputs the real-time information to the data processing circuit 218. The data processing circuit 218 processes the inputted real-time information, i.e., information such as the progressive states of the distance measurers into data indicating road traffic states and outputs the processed data to the database update circuit 203. The data processing circuit 218 processes a plurality of pieces of real-time information into data and outputs the processed data to the database update circuit 203. That is to say, a plurality of pieces of real-time information are aggregated (step S220). The database update circuit 203 updates the real-time information having the same address and stored in the database 25 using the real-time information inputted from the data processing circuit 218. The database write circuit 206 writes the updated real-time information to the database 25.

Thereafter, the server 20A reads the real-time information from the database 25 and transmits the real-time information to the clients (step S222). The respective clients 1 and 2 receive the real-time information transmitted from the server 20A and make use of the information for the traveling of their own vehicles and the like.

As can be seen, by transmitting the real-time information from a plurality of clients, the server 20A can collect diversified real-time information and provide carefully thought out services to the clients.

According to the navigation system 200 shown in FIG. 9, each client can be informed of the traffic states of the roads in the traveling direction of the client in accordance with the flow chart shown in FIG. 6. Besides, the client can make a restaurant reservation or the like and purchase an article displayed on a shop while moving by vehicle.

The other advantages are the same as those of the first embodiment.

According to the second embodiment, the server collects real-time information including traffic states, weather conditions and congested states around a plurality of clients from these clients and transmits the collected real-time information to the respective clients. It is, therefore, possible to provide more carefully thought out services to the clients.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A navigation system comprising:

a database holding real-time information indicating a ground state;

a server receiving positional information including a present position of a client through a communication network, determining, as an information extraction range, a certain range on a map wider than a surrounding area of said present position based on said positional information, extracting, as real-time information to be transmitted, real-time information falling within said information extraction range and having a transmittable largest data quantity from said database, adding a header identifiable by said client to the extracted real-time information and transmitting the header-added real-time information through said communication network at random; and a navigator transmitting said positional information to said server through said communication network, receiving information from said server through said communication network, detecting said extracted real-time information from the received information while using said header, and displaying the detected real-time information.

2. The navigation system according to claim 1, wherein said server determines a certain range on an orthogonal coordinate with said present position set as an origin, as said information extraction range.

3. The navigation system according to claim 1, wherein said server updates the real-time information held by said database at certain time intervals or every time the positional information from the client is received.

4. The navigation system according to claim 1, wherein said navigator extracts real-time information falling within a designated range inputted by the client from said received real-time information based on the designated range inputted by the client, and displays the extracted real-time information.

5. The navigation system according to claim 1, wherein said real-time information is a traffic state from said present position to a destination.

6. The navigation system according to claim 1, wherein said navigator transmits moving time of the client from said present position to said server through said communication network; and said server detects a range in which the client can move within said moving time based on traffic states of roads around said present position, and determines the detected range as said information extraction range.

7. The navigation system according to claim 1, wherein said real-time information includes a congested state of a restaurant;

said navigator transmits a request inputted by the client to make a reservation at said restaurant to said server through said communication netowrk; and said server receives said reservation request through said communication network, executes said requested reservation, and transmits an execution result to said navigator through said communication network.

8. The navigation system according to claim 1, wherein said real-time information includes a congested state of a shop, an article display state and a traffic state near the shop.

9. A navigation system comprising:

a database holding real-time information indicating a ground state;

a server receiving positional information including a present position of a client through a communication network, determining, as an information extraction range, a certain region on a map wider than a surrounding area of said present position based on said positional information, extracting, as information to be transmitted, real-time information failing within said information extraction range from said database, adding a header identifiable by said client to the extracted real-time information, and transmitting the header-added real-time information through said communication network at random; and a navigator transmitting said positional information to said server through said communication network, receiving information from said server through said communication network, detecting said extracted real-time information from the received information while using said header, and displaying the detected real-time information, wherein said server receives surrounding information on the client from a plurality of clients, and updates the real-time information in said database using the received surrounding information.

10. The navigation system according to claim 9, wherein said surrounding information is information on an electrical system of a vehicle taken by said client.

11. The navigation system according to claim 9, wherein said surrounding information is a history of the vehicle taken by said client.

12. The navigation system according to claim 9, wherein said surrounding information is a wiper speed of the vehicle taken by said client.

13. The navigation system according to claim 9, wherein said server receives said surrounding information from said plurality of clients at certain time intervals.

14. The navigation system according to claim 9, wherein said server extracts the real-time information falling within said information extraction range from the real-time information updated using said surrounding information, and transmits the extracted real-time information to said navigator through said communication network.

* * * * *